(12) United States Patent
Behnamfar et al.

(10) Patent No.: US 11,917,537 B2
(45) Date of Patent: Feb. 27, 2024

(54) POWER MANAGEMENT IN WIRELESS MODEMS

(71) Applicant: Apple Inc., Cupertino, CA (US)

(72) Inventors: Firouz Behnamfar, San Jose, CA (US); Faraz Faheem, Santa Clara, CA (US); Farouk Belghoul, Campbell, CA (US); Rema Vaidyanathan, San Diego, CA (US)

(73) Assignee: Apple Inc., Cupertino, CA (US)

( * ) Notice: Subject to any disclaimer, the term of this patent is extended or adjusted under 35 U.S.C. 154(b) by 444 days.

(21) Appl. No.: 17/144,398

(22) Filed: Jan. 8, 2021

(65) Prior Publication Data

US 2021/0345238 A1 Nov. 4, 2021

Related U.S. Application Data

(60) Provisional application No. 63/017,195, filed on Apr. 29, 2020.

(51) Int. Cl.
*H04W 52/02* (2009.01)
*H04W 52/00* (2009.01)
(Continued)

(52) U.S. Cl.
CPC ............ *H04W 52/00* (2013.01); *G06F 1/206* (2013.01); *G06F 1/28* (2013.01); *G06F 1/3296* (2013.01); *H04W 4/20* (2013.01)

(58) Field of Classification Search
CPC ....... H04W 52/00; H04W 4/20; H04W 52/02; H04W 52/0209; G06F 1/206; G06F 1/28; G06F 1/3296; G06F 1/3278; Y02D 10/00
See application file for complete search history.

(56) References Cited

U.S. PATENT DOCUMENTS

| | | | |
|---|---|---|---|
| 6,848,054 B1 * | 1/2005 | Watts, Jr. ................ | G06F 1/324 713/300 |
| 10,548,077 B2 * | 1/2020 | Suerbaum ......... | H04W 52/0203 |

(Continued)

OTHER PUBLICATIONS

"3rd Generation Partnership Project; Technical Specification Group Radio Access Network; NR; Radio Resource Control (RRC) protocol specification (Release 15)." 3GPP TS 38.331 V15.4.0 (Dec. 2018).

(Continued)

*Primary Examiner* — Andrew Wendell
(74) *Attorney, Agent, or Firm* — Eschweiler & Potashnik, LLC

(57) ABSTRACT

Techniques discussed herein can facilitate power management at a User Equipment (UE) via selection of a power management stage based on a current power status. One example aspect is a UE comprising one or more processors configured to: monitor a temperature of the UE via one or more temperature sensors and a power usage of the UE; determine a power status of the UE based at least in part on the temperature of the UE and the power usage of the UE; select, based at least in part on the determined power status, a power management stage of a plurality of power management stages; and implement one or more power management techniques associated with the selected power management stage. A notification can be triggered to alert a user that the processor is implementing the one or more power management techniques prior to implementation.

18 Claims, 8 Drawing Sheets

(51) Int. Cl.
*H04W 4/20* (2018.01)
*G06F 1/3296* (2019.01)
*G06F 1/20* (2006.01)
*G06F 1/28* (2006.01)

(56) References Cited

U.S. PATENT DOCUMENTS

| | | | |
|---|---|---|---|
| 2013/0007482 A1* | 1/2013 | Rodriguez | H04W 52/0251 |
| | | | 713/320 |
| 2013/0155081 A1* | 6/2013 | Khodorkovsky | G06F 1/329 |
| | | | 345/522 |
| 2017/0371394 A1* | 12/2017 | Chan | G06F 1/3218 |
| 2018/0059747 A1* | 3/2018 | Pfeifer | G06F 1/3206 |
| 2018/0157315 A1* | 6/2018 | Ehsan | G06F 1/3296 |
| 2019/0041926 A1* | 2/2019 | Guy | H04L 45/14 |
| 2019/0132037 A1* | 5/2019 | Lin | H04B 7/0626 |
| 2019/0320358 A1* | 10/2019 | Knapp | H04W 52/0241 |
| 2020/0073469 A1* | 3/2020 | Sadowski | G06F 1/324 |
| 2020/0359247 A1* | 11/2020 | Yi | H04W 24/10 |
| 2020/0379532 A1* | 12/2020 | Vanrell | G06F 1/1698 |
| 2020/0382062 A1* | 12/2020 | Khlat | H03F 3/68 |
| 2021/0336686 A1* | 10/2021 | Rune | H04B 7/0617 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)." 3GPP TS 36.331 V15.4.0 (Dec. 2018).

* cited by examiner

POWER MANAGEMENT IN WIRELESS MODEMS

CROSS REFERENCE TO RELATED APPLICATIONS

This application claims the benefit of U.S. Provisional Patent Application No. 63/017,195 filed Apr. 29, 2020, entitled "POWER MANAGEMENT IN WIRELESS MODEMS", the contents of which are herein incorporated by reference in their entirety.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

DETAILED DESCRIPTION

Figure 1:
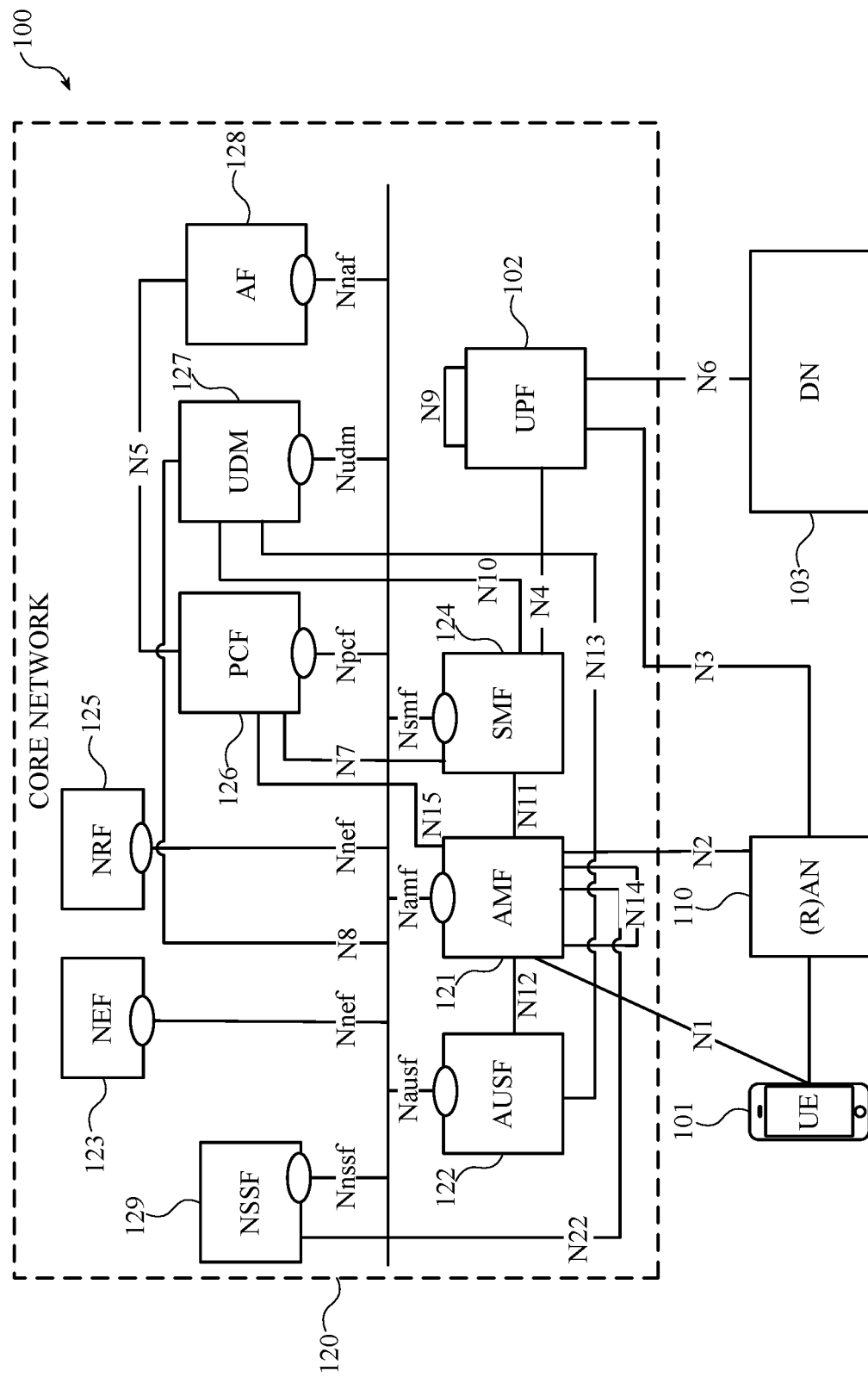
FIG. 1 is a block diagram illustrating an architecture of a system including a Core Network (CN), for example a Fifth Generation (5G) CN (5GC), in accordance with various aspects.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to communicate via a 3GPP RAN, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more," unless the context indicates otherwise (e.g., "the empty set," "a set of two or more Xs," etc.).

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects described herein can be implemented into a system using any suitably configured hardware and/or software. FIG. 1 illustrates an architecture of a system 100 including a Core Network (CN) 120, for example a Fifth Generation (5G) CN (5GC), in accordance with various aspects. The system 100 is shown to include a UE 101, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes (e.g., Evolved Node B(s) (eNB(s)), next generation Node B(s) (gNB(s), and/or other nodes) or other nodes or access points; and a Data Network (DN) 203, which can be, for example, operator services, Internet access or third party services; and a Fifth Generation Core Network (5GC) 120. The 5GC 120 can comprise one or more of the following functions and network components: an Authentication Server Function (AUSF) 122; an Access and Mobility Management Function (AMF) 121; a Session Management Function (SMF) 124; a Network Exposure Function (NEF) 123; a Policy Control Function (PCF) 126; a Network Repository Function (NRF) 125; a Unified Data Management (UDM) 127; an Application Function (AF) 128; a User Plane (UP) Function (UPF) 102; and a Network Slice Selection Function (NSSF) 129, which can be connected by various interfaces and/or reference points, for example, as shown in FIG. 1.

Figure 2:
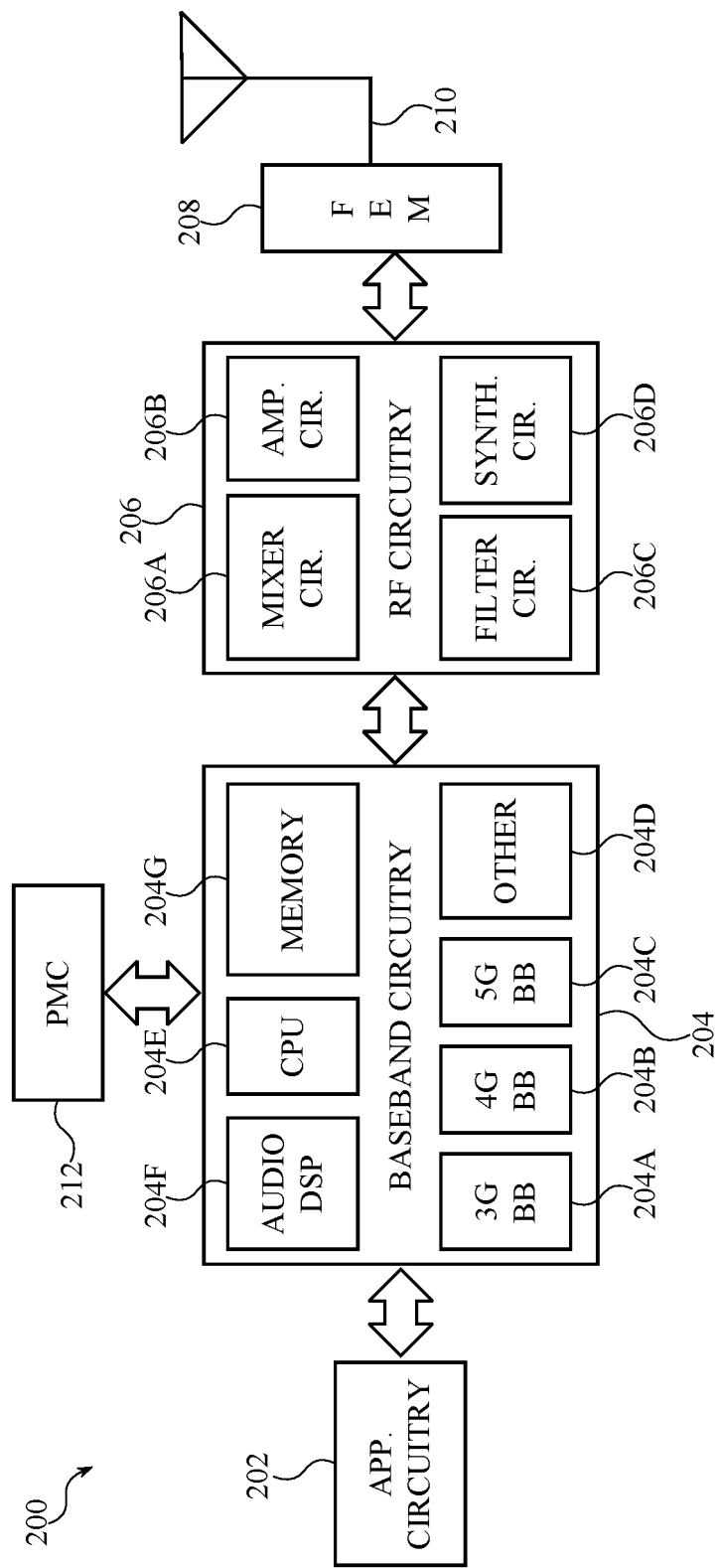
FIG. 2 is a diagram illustrating example components of a device that can be employed in accordance with various aspects discussed herein.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some aspects, the device 200 can include fewer elements (e.g., a RAN node may not utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor (including one or more temperature sensors, such as a single temperature sensor, a plurality of temperature sensors at different locations in device 200, etc.), or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EU-TRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206d can be a fractional N/N+1 synthesizer.

In some aspects, frequency input can be provided by a voltage controlled oscillator (VCO), although that is not a requirement. Divider control input can be provided by either the baseband circuitry 204 or the applications processor 202 depending on the desired output frequency. In some aspects, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM 208, or in both the RF circuitry 206 and the FEM 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other aspects, the PMC 212 may be additionally or alternatively coupled with, and perform similar power management operations for, other components such as, but not limited to, application circuitry 202, RF circuitry 206, or FEM 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
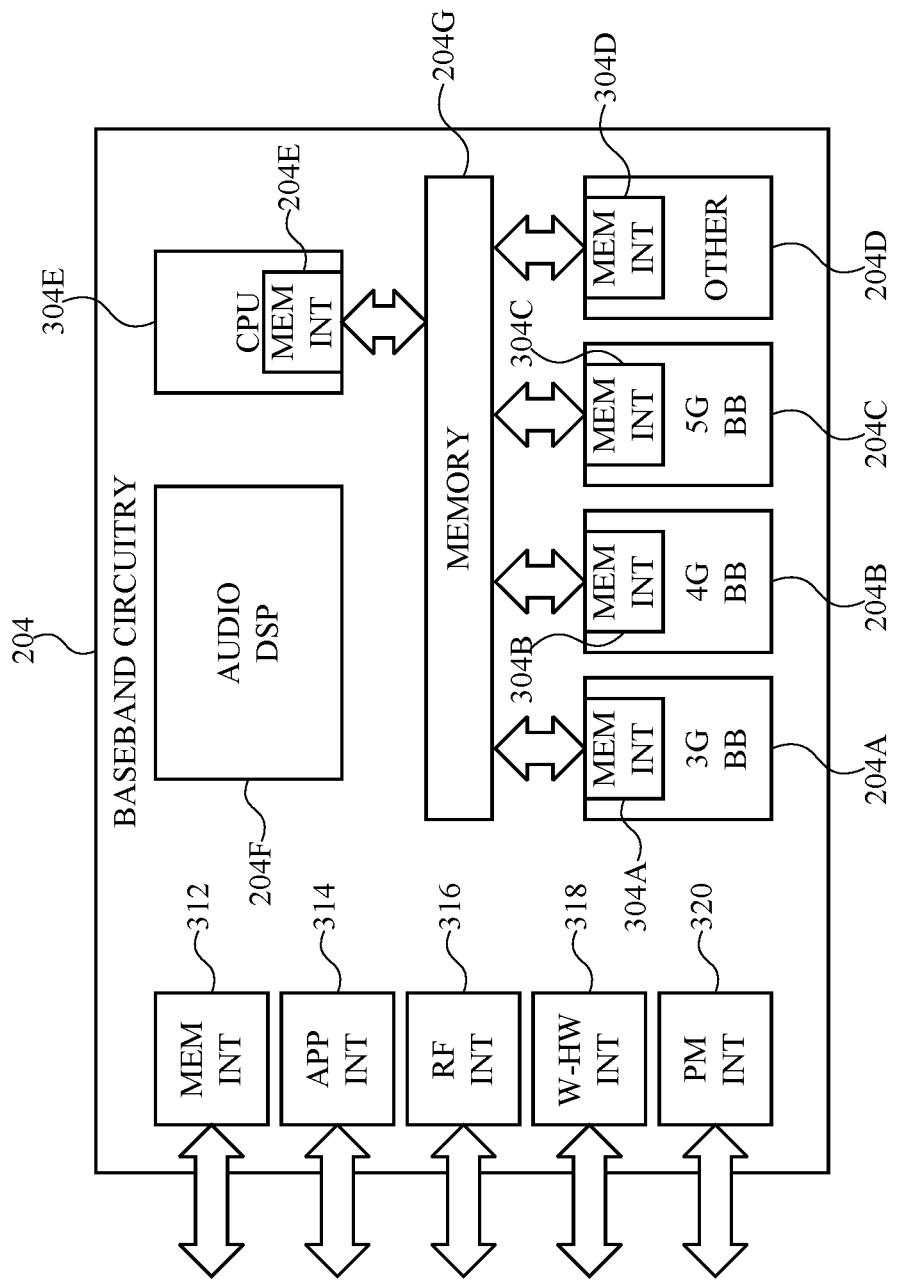
FIG. 3 is a diagram illustrating example interfaces of baseband circuitry that can be employed in accordance with various aspects discussed herein.

FIG. 3 illustrates example interfaces of baseband circuitry in accordance with some aspects. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

As discussed in greater detail herein, various aspects, which can be employed, for example, at a UE, can facilitate power management in connection with wireless modem(s). Various aspects can employ power management techniques discussed herein, wherein, based on monitored levels of power consumption and temperature, one or more power management stages discussed herein can be employed to mitigate overheating. Power management stages discussed herein can reduce power consumption and associated overheating caused by 5G (Fifth Generation) NR (New Radio) operation, LTE (Long Term Evolution) operation, or both.

Figure 4:
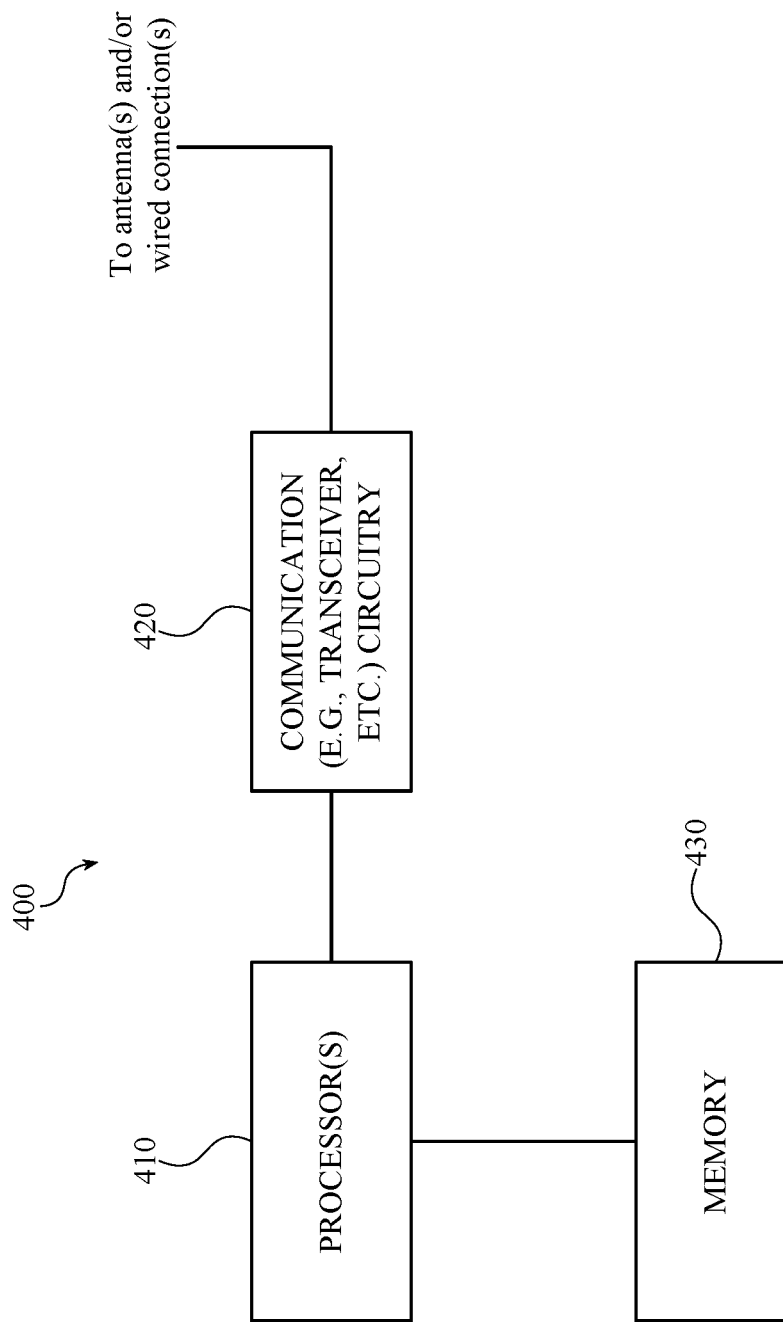
FIG. 4 is a block diagram illustrating a system that facilitates power management in connection with wireless modem(s), according to various aspects discussed herein.

Referring to FIG. 4, illustrated is a block diagram of a system 400 employable at a UE (User Equipment), a next generation Node B (gNodeB or gNB) or other BS (base station)/TRP (Transmit/Receive Point), or another component of a 3GPP (Third Generation Partnership Project) network (e.g., a 5GC (Fifth Generation Core Network)) component or function such as a UPF (User Plane Function)) that facilitates power management in connection with wireless modem(s), according to various aspects discussed herein. System 400 can include processor(s) 410, communication circuitry 420, and memory 430. Processor(s) 410 (e.g., which can comprise one or more of 202 and/or 204A-204F, etc.) can comprise processing circuitry and associated interface(s) (e.g., a communication interface (e.g., RF circuitry interface 316) for communicating with communication circuitry 420, a memory interface (e.g., memory interface 312) for communicating with memory 430, etc.). Communication circuitry 420 can comprise, for example circuitry for wired and/or wireless connection(s) (e.g., 206 and/or 208), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory 204G, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 410 or transceiver circuitry 420).

Specific types of aspects of system 400 (e.g., UE aspects) can be indicated via subscripts (e.g., system $400_{UE}$ comprising processor(s) $410_{UE}$, communication circuitry $420_{UE}$, and memory $430_{UE}$). In some aspects, such as BS aspects (e.g., system $400_{gNB}$) and network component (e.g., UPF (User Plane Function), etc.) aspects (e.g., system $400_{UPF}$) processor(s) $410_{gNB}$ (etc.), communication circuitry (e.g., $420_{gNB}$, etc.), and memory (e.g., $430_{gNB}$, etc.) can be in a single device or can be included in different devices, such as part of a distributed architecture. In aspects, signaling or messaging between different aspects of system 400 (e.g., $400_1$ and $400_2$) can be generated by processor(s) $410_1$, transmitted by communication circuitry $420_1$ over a suitable interface or reference point (e.g., a 3GPP air interface, N3, N4, etc.), received by communication circuitry $420_2$, and processed by processor(s) $410_2$. Depending on the type of interface, additional components (e.g., antenna(s), network port(s), etc. associated with system(s) $400_1$ and $400_2$) can be involved in this communication.

In various aspects, one or more of information (e.g., system information, resources associated with signaling, etc.), features, parameters, etc. can be configured to a UE via signaling (e.g., associated with one or more layers, such as L1 signaling or higher layer signaling (e.g., MAC, RRC, etc.)) from a gNB or other access point (e.g., via signaling generated by processor(s) $410_{gNB}$, transmitted by communication circuitry $420_{gNB}$, received by communication circuitry $420_{UE}$, and processed by processor(s) $410_{UE}$). Depending on the type of information, features, parameters, etc., the type of signaling employed and/or the exact details of the operations performed at the UE and/or gNB in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

The 3GPP (Third Generation Partnership Project) technical specifications (TSs) define optional power management related messages between a UE (User Equipment) and Base Station (BS, e.g., eNB (Evolved Node B) or gNB (next generation Node B), etc.).

As a first example, an OverheatingAssistance message is defined in 3GPP TS 36.331 V15.4.0 (2018-12) for LTE as follows:

```
OverheatingAssistance-r14 ::=       SEQUENCE {
    reducedUE-Category                 SEQUENCE {
        reducedUE-CategoryDL              INTEGER (0..19),
        reducedUE-CategoryUL              INTEGER (0..21)
    }   OPTIONAL,
    reducedMaxCCs                      SEQUENCE {
        reducedCCsDL                      INTEGER (0..31),
        reducedCCsUL                      INTEGER (0..31)
    }   OPTIONAL
}
```

The reducedUE-CategoryDL and reducedUE-CategoryUL parameters can limit the data rate, while the reducedCCsDL and reducedCCsUL parameters can limit the number of Component Carriers (CCs) and thus the total bandwidth (BW). Alone or in combination, these parameters can limit the total amount of downlink (DL) and/or uplink (UL) data received and/or transmitted by the UE, and corresponding power usage.

As a second example, another OverheatingAssistance message is defined in 3GPP TS 38.331 V15.4.0 (2018-12) for 5G NR as follows:

```
OverheatingAssistance ::=           SEQUENCE {
    reducedMaxCCs                      SEQUENCE {
        reducedCCsDL                      INTEGER (0..31),
        reducedCCsUL                      INTEGER (0..31)
    } OPTIONAL,
    reducedMaxBW-FR1                   SEQUENCE {
        reducedBW-FR1-DL                  ReducedAggregatedBandwidth,
        reducedBW-FR1-UL                  ReducedAggregatedBandwidth
    } OPTIONAL,
    reducedMaxBW-FR2                   SEQUENCE {
        reducedBW-FR2-DL                  ReducedAggregatedBandwidth,
        reducedBW-FR2-UL                  ReducedAggregatedBandwidth
    } OPTIONAL,
    reducedMaxMIMO-LayersFR1           SEQUENCE {
        reducedMIMO-LayersFR1-DL          MIMO-LayersDL,
        reducedMIMO-LayersFR1-UL          MIMO-LayersUL
    } OPTIONAL,
    reducedMaxMIMO-LayersFR2           SEQUENCE {
        reducedMIMO-LayersFR2-DL          MIMO-LayersDL
        reducedMIMO-LayersFR2-UL          MIMO-LayersUL
    } OPTIONAL
}
```

The reducedMIMO-LayersFR1-DL, reducedMIMO-LayersFR1-UL, reducedMlMO-LayersFR2-DL, and reducedMlMO-LayersFR2-UL parameters can separately reduce the number of spatial streams (and hence limit the data rate) for DL and/or UL for Frequency Range 1 (sub-6 GHz) and/or Frequency Range 2 (mmWave (millimeter wave, e.g., 24 GHz and up), while the bandwidth can be limited similarly to the LTE OverheatingAssistance IE (Information Element) via reducedCCsDL and reducedCCsUL and/or with one or more of reducedBW-FR1-DL, reducedBW-FR1-UL, reduced BW-FR2-DL, or reducedBW-FR1-DL (e.g., reducing from a full system BW of 100 to 10, etc.). If supported, these parameters can limit the total amount of downlink (DL) and/or uplink (UL) data received and/or transmitted by the UE, and corresponding power usage. However, no existing network supports this OverheatingAssistance IE.

Over time, high power consumption can negatively impact the lifespan of a device by causing damage to device components, As a result, in addition to the optional 3GPP OverheatingAssistance messages, which define tools for power management, proprietary solutions can also be employed, such as blanking (e.g., throttling) in UL (e.g., not transmitting UL data and/or transmitting UL data at a lower rate) and suspending DL data (e.g., not receiving some or all scheduled DL data for at least a limited time), wherein the UL and DL links can revert to normal operation once thermal issues are resolved. As another example of a proprietary solution, depending on power availability and thermal conditions, the UE can apply and/or adjust a duty cycle to transmissions, with active and inactive periods (which can also be ended once thermal issues are resolved).

5G NR consumes a higher amount of power than 4G LTE. Therefore, there is an even greater need for efficient and smart power management methods for 5G NR than for LTE. Additionally, at least in the early deployments, 5G is activated concurrently with LTE (e.g., using EN (E-UTRA (Evolved Universal Terrestrial Radio Access)-NR)-DC (Dual Connectivity) or NSA (Non-Stand Alone) configurations). As such, power management is significantly more complicated than for LTE-only deployments. Additionally, while 3GPP defines overheating messages for LTE and NR, when to use these message(s) and what component(s) of these message(s) to use are not trivial and are left to implementation, and support of overheating message components is optional. Accordingly, various aspects can employ techniques discussed herein for power management for NR and/or LTE modems, wherein these techniques address both scenarios when overheating messages are supported and scenarios when they are not supported.

Figure 5:
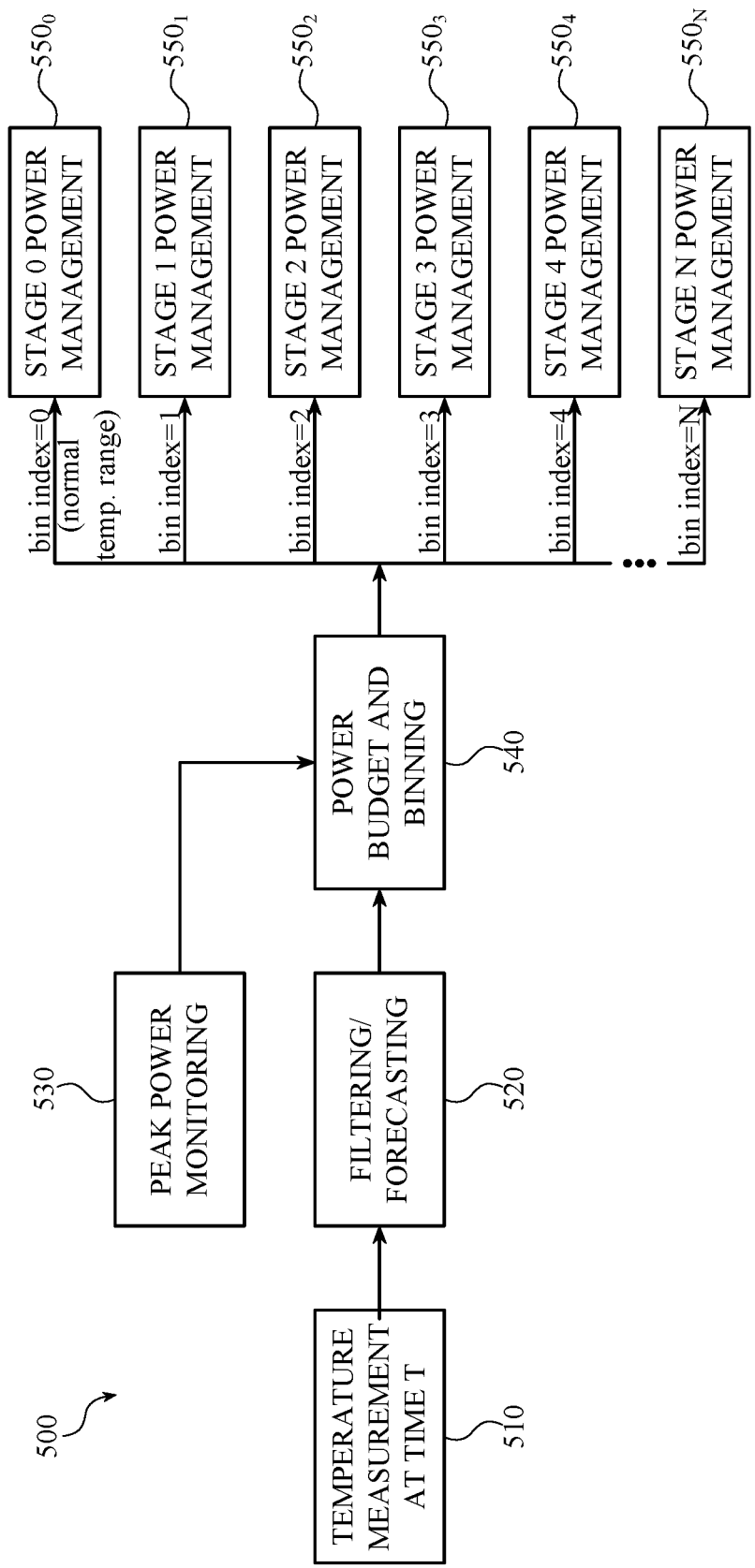
FIG. 5 is a flow diagram of a first example method or process employable at a UE that facilitates power management according to one of a plurality of power management stages in connection with one or more wireless modems, according to various aspects discussed herein.

Referring to FIG. 5, illustrated is a flow diagram of a first example method or process 500 employable at a UE that facilitates power management according to one of a plurality of power management stages in connection with one or more wireless modems, according to various aspects discussed herein. In other aspects, a machine readable medium can store instructions associated with method 500 that, when executed, can cause a UE (e.g., employing system $400_{UE}$) to perform the acts of method 500.

On a periodic and/or ongoing basis, temperature measurements can be taken from one or more temperature sensors of the UE (e.g., a single temperature sensor, a plurality of temperature sensors at different locations in the UE, etc.) to measure potential overheating (e.g., from power usage, etc.) at the UE. At 510, temperature measurement(s) can be taken at time t.

At 520, optional filtering of a set of temperature data (comprising the temperature measurement at time t) and forecasting based on the set of temperature data can be performed. The temperature forecasting can comprise determining one or more of whether the temperature will stay the same/increase/decrease, a rate of change of the temperature, a predicted future temperature (e.g., any of which can be based on current operating conditions and/or power management stage(s), etc.).

At 530, peak power usage can be monitored on a periodic and/or ongoing basis, which can comprise, for example, determining a peak power within a given time window (e.g., a most recent N milliseconds/seconds/etc.).

At 540, based on the monitored peak power and forecast temperature (e.g., optionally after filtering), a determination can be made of current and/or predicted power usage relative to a power budget, wherein the determination can comprise assigning a current/expected power and/or overheating status (which can be referred to herein as a "power status") (e.g., which can be based at least in part on a ratio of peak power usage to power budget, a current and/or forecasted temperature, etc.) to one of a plurality of bins, wherein each bin can be associated with a distinct power management stage $550_i$ of a plurality of power management stages that can be employed on a temporary basis until overheating is mitigated. After implementation of a power management stage $550_i$, method 500 can return to 510 for further temperature monitoring.

Additionally or alternatively, method 500 can include one or more other acts described herein in connection with various aspects of a UE and/or system $400_{UE}$.

Various aspects can employ a configurable design including a plurality of different power management stages, wherein the quantity and/or power management techniques associated with each stage can vary for some or all power management stages between aspects. Various aspects can employ (e.g., for a bin with a lowest power status, for example, operation within a normal temperature range, etc.) as "stage 0" power management either no power management, one or more power management techniques that are always in effect, and/or one or more power management techniques that remain in effect unless replaced by more stringent power management techniques.

For temperatures above a normal operating range, depending on the power status, it can be assigned to one or more additional bins (e.g., bin 1, bin 2, ... bin N), each of which can have an associated power management stage (e.g., stage 1 power management, stage 2 power management, ... stage N power management).

In various aspects involving potential UE operation in NR and LTE, the N power management stages other than stage 0 can comprise one or more NR power management stages (e.g., such as those discussed herein, etc.) that can reduce power from NR operation and one or more LTE power management stages (e.g., such as those discussed herein, etc.) that can reduce power from LTE operation (in aspects omitting NR or LTE operation, the corresponding power management stages can be omitted). In various aspects, the N power management stages can also comprise one or more power management stages that affect operation in both NR and LTE.

In various aspects, when a power management stage is selected based on bin selection from the power status, power management techniques for that power management stage can be applied, and power management techniques of lower stages (e.g., power management stages associated with power statuses closer to normal operating conditions, if any) can optionally also be applied (e.g., in various aspects, power management techniques of lower stages can be applied if they have not been superseded by a power management technique of a higher stage that will also be applied, etc.).

In various aspects, one or more power management stages can comprise one or more of the following techniques associated with a low power NR mode: (a) restricting NR operation to FR1 (sub-6 GHz); (b) low-power beam management (e.g., including using a reduced number of beams in initial beam detection/selection); (c) using a lower number of beams in beam tracking; (d) using sub-optimal yet power-efficient beam selection methods; (e) using low-power measurements; and/or (f) using a reduced BWP size in NR (if supported by the network). In some aspects, one or more of these techniques can be employed together as a single power management stage employing low power NR mode techniques (e.g., and can comprise initial power management stages following normal operation, although other orderings of power management stages can also be applied), while in other aspects, two or more separate power management stages can employ techniques associated with a low power NR mode.

In various aspects, one or more power management stages can comprise one or more of the following techniques associated with a restricted NR mode: (a) employing a reduced number of component carriers (CCs) in NR; (b) employing a reduced number of spatial streams (i.e., MIMO (Multiple Input Multiple Output) layers) in NR (if supported by the network); (c) reporting a lower value in PHR (Power Headroom Report) in NR (e.g., including setting it to zero); (d) UL (Uplink) throttling (e.g., reducing maximum data rate via various techniques) and/or transmit power capping in NR; (e) DL (Downlink) throttling in NR; (f) Reporting a value lower than an accurate value (e.g., including potentially '0', etc.) in BSR (Buffer Status Report) on NR; and/or (g) Suspending data communication in NR (e.g., but retaining VoIP when VoIP is supported on NR). In some aspects, one or more of these techniques can be employed together as a single power management stage employing restricted NR mode techniques (e.g., following any low power NR mode stage(s), although other orderings can also be applied, etc.), while in other aspects, two or more separate power management stages can employ techniques associated with a restricted NR mode.

In various aspects, one or more power management stages can comprise one or more of the following techniques associated with a restricted LTE mode: (a) employing a reduced number of component carriers (CCs) in LTE; (b) employing a reduced number of spatial streams (i.e., MIMO layers) in LTE (if supported by the network); (c) reporting a lower value in PHR (Power Headroom Report) in LTE (e.g., including setting it to zero); (d) UL (Uplink) throttling (e.g., reducing maximum data rate via various techniques) and/or transmit power capping in LTE; (e) DL (Downlink) throttling in LTE; (f) Reporting a value lower than an accurate value (e.g., including potentially '0', etc.) in BSR (Buffer Status Report) on LTE; and/or (g) Suspending data communication in LTE (e.g., but retaining VoIP when VoIP is supported on LTE). In some aspects, one or more of these techniques can be employed together as a single power management stage employing restricted LTE mode techniques (e.g., following any low power NR mode stage(s) and restricted NR mode stage(s), etc., although other orderings can also be applied), while in other aspects, two or more separate power management stages can employ techniques associated with a restricted LTE mode.

In various aspects, a power management stage can be included that restricts operation to only LTE (e.g., deactivating NR communication). In some aspects, an LTE-only mode power management stage can follow any low power NR mode stage(s), restricted NR mode stage(s), and restricted LTE mode stage(s) (although other orderings can also be applied), while in other aspects, restricted LTE mode stage(s) can follow an LTE-only mode stage.

In various aspects, one or more further power management stages can be included, which can include further techniques for managing overheating, such as deactivating LTE and NR, deactivating all 3GPP communications, deactivating all wireless communications (e.g., airplane mode), powering down the UE, etc. In various aspects, power management stage(s) involving deactivation of both LTE and NR (e.g., and optionally one or more other wireless communication modes such as WiFi, Bluetooth®, Near Field Communication (NFC), etc.) can be one or more final power management stages that can follow other power management stage(s).

For ease of discussion, low power NR techniques, restricted NR mode techniques, restricted LTE mode techniques, LTE-only mode, and techniques involving deactivation of both LTE and NR have been discussed separately and in connection with separate power management stages. However, some aspects can employ one or more power management stages wherein techniques from more than one of these categories can be combined in a single power management stage (e.g., a single NR power management stage employing one or more low power NR techniques and one or more restricted NR mode techniques, a single restricted mode stage employing one or more restricted NR mode techniques and one more restricted LTE mode techniques, etc.).

As one example aspect, six power management stages (e.g., stages 0-5) can be employed, with: stage 0 power management corresponding to normal operation (e.g., which can include any default power management techniques (e.g., ones always applied, or applied in the absence of more stringent techniques, etc.)); stage 1 power management employing one or more low power NR techniques, stage 2 power management employing one or more restricted NR mode techniques, stage 3 power management employing one or more restricted LTE mode techniques, stage 4 employing NR deactivation (e.g., LTE-only mode), and stage 5 employing airplane mode. In various aspects, techniques of earlier stages can also be employed unless superseded by more stringent techniques (e.g., continuing to employ low power and/or restricted NR mode techniques at stage 3, with those techniques superseded at stages 4 and 5).

In various aspects, activation of a power management stage and/or one or more power management techniques of a power management stage can trigger a notification to a user. The notification can alert the user that the UE is now switching to a different power management stage/technique. In some such aspects, a notification can be triggered only for some power management stages/techniques (e.g., a stage employing airplane mode, etc.) but not others (e.g., stages just employing low power NR mode techniques, etc.), while in other aspects, each stage/technique can trigger a notification. Additionally, in some aspects, notifications that are triggered can be provided immediately, while in other aspects, notifications can be provided after a delay (e.g., N milliseconds/seconds, etc.) if the power management stage triggering the delay is still in operation. While some techniques potentially employed by various power management stages already trigger changes in notifications that can be visible to users (e.g., airplane mode, LTE-only mode (in connection with which a 5G notification would no longer be present), etc.), triggering an additional notification (e.g., tying the mode change to overheating) can provide context to a user that explains why the mode change occurred, the temporary nature of the mode change, etc.

Additionally, if supported, NR and/or LTE OverheatingAssistance message(s) can be triggered in connection with associated power management stage(s). As one example, if restricted NR mode techniques would be implemented based on the power management stage selected based on the power status, prior to implementing restricted NR mode techniques, a NR OverheatingAssistance message can be transmitted by the UE if supported by the network. Similarly, if restricted LTE mode techniques would be implemented based on the power management stage selected based on the power status, prior to implementing restricted NR mode techniques, a LTE OverheatingAssistance message can be transmitted by the UE if supported by the network.

In various aspects, power management stages discussed herein can be implemented in response to overheating, and can be effective at mitigating that overheating. As a result, however, in some scenarios, this can result in the current power management stage rapidly cycling between two or more power management stages. In order to reduce rapid cycling between two or more power management stages, one or more techniques can be employed based on temperature and/or time.

Figure 6:
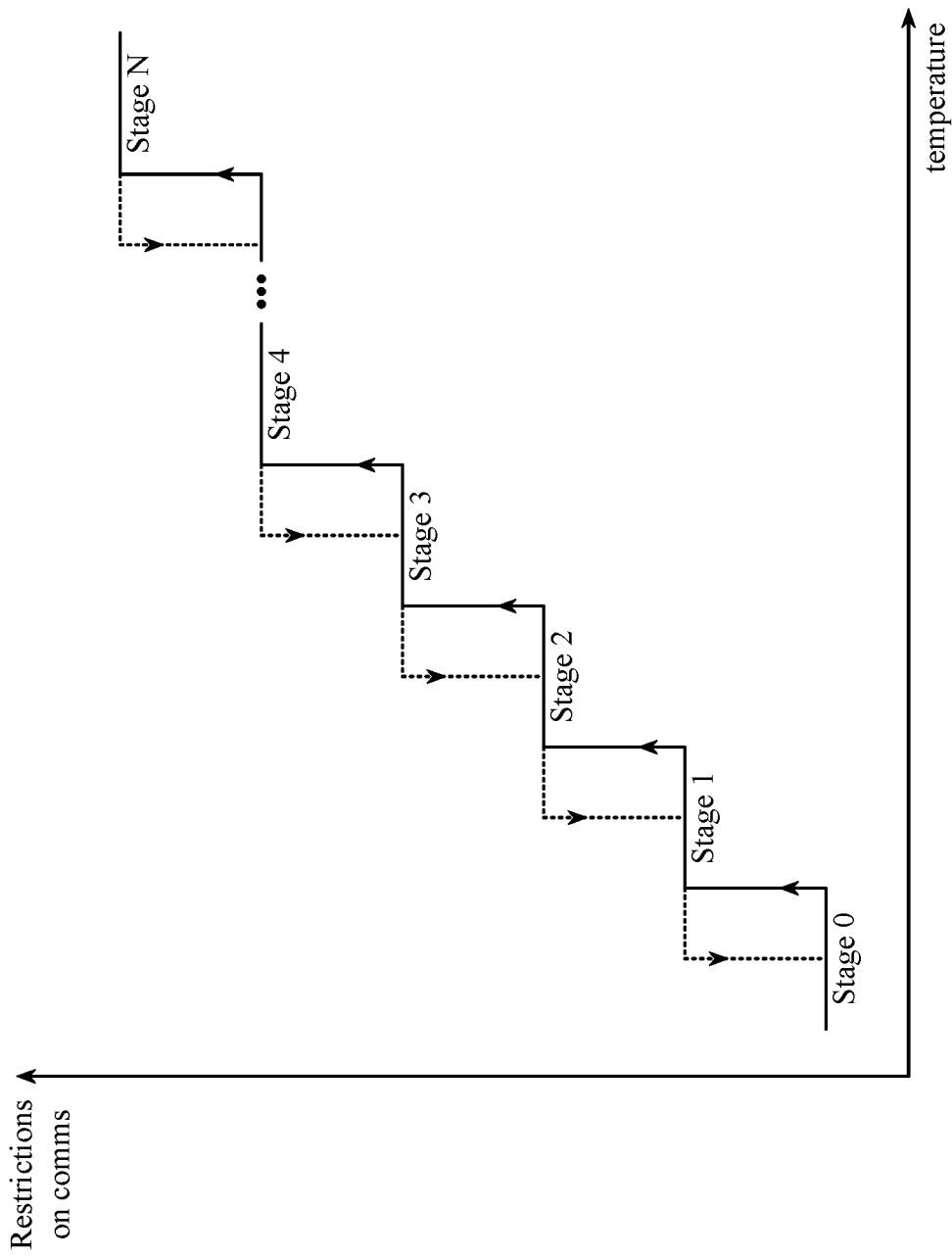
FIG. 6 is a diagram showing an example of temperature-based hysteresis to reduce rapid cycling between two or more power management stages, in accordance with various aspects discussed herein.

In one example, hysteresis based on temperature or power status can be employed, wherein for each power management stage, transitions from that power management stage to the following (e.g., more stringent, etc.) power management stage can be based on a first threshold value for the power status (e.g., first temperature, etc.), while transition in the reverse direction (from the following power management stage to that power management stage) can be based on a second threshold value lower than the first threshold value (e.g., with each different pair of power management stages having a different pair of threshold values for transition). Referring to FIG. 6, illustrated is a diagram showing an example of temperature-based hysteresis to reduce rapid cycling between two or more power management stages, in accordance with various aspects discussed herein. As can be seen in FIG. 6, transitions from earlier stages to subsequent stages (e.g., stage 0 to stage 1, stage 1 to stage 2, etc.) can occur at a higher temperature (as indicated by the solid vertical segments) than transitions in the opposite direction (as indicated by the dashed vertical and horizontal segments). This can prevent rapid cycling between power management stages (e.g., such as in a scenario wherein overheating causes a transition from stage 1 to stage 2, followed by rapid cooling from reduced power usage at stage 2 leading to a rapid transition back to stage 1, causing overheating leading back to stage 2, etc.).

In another example, time-based techniques can be employed to reduce rapid cycling between power management stages. In one example time-based technique, transitions from lower power management stages to higher power management stages can occur based solely on power status, but transitions from higher power management stages to lower power management stages can occur only after the associated power status has been maintained for at least a threshold time (e.g., x milliseconds/seconds, etc.), or only if the higher power management stage has been in effect for a threshold amount of time, etc.

Additionally, in some aspects, both time and temperature/ overheating status can be employed as criteria to reduce rapid cycling between power management stages, either as joint criteria (e.g., with transitions based on both being met) or alternative criteria (e.g., with transitions based on either being met). As one example, transition from a lower power management stage to the next higher power management stage can occur if a first temperature threshold is exceeded, while the reverse transition can occur only if the temperature stays below a second (lower) threshold for at least a threshold amount of time. As another example, transition from a lower power management stage to the next higher power management stage can occur if a first temperature threshold is exceeded, while the reverse transition can occur either if the temperature crosses below a second (lower) threshold or if the temperature stays below the first temperature threshold for at least a threshold amount of time.

Figure 7:
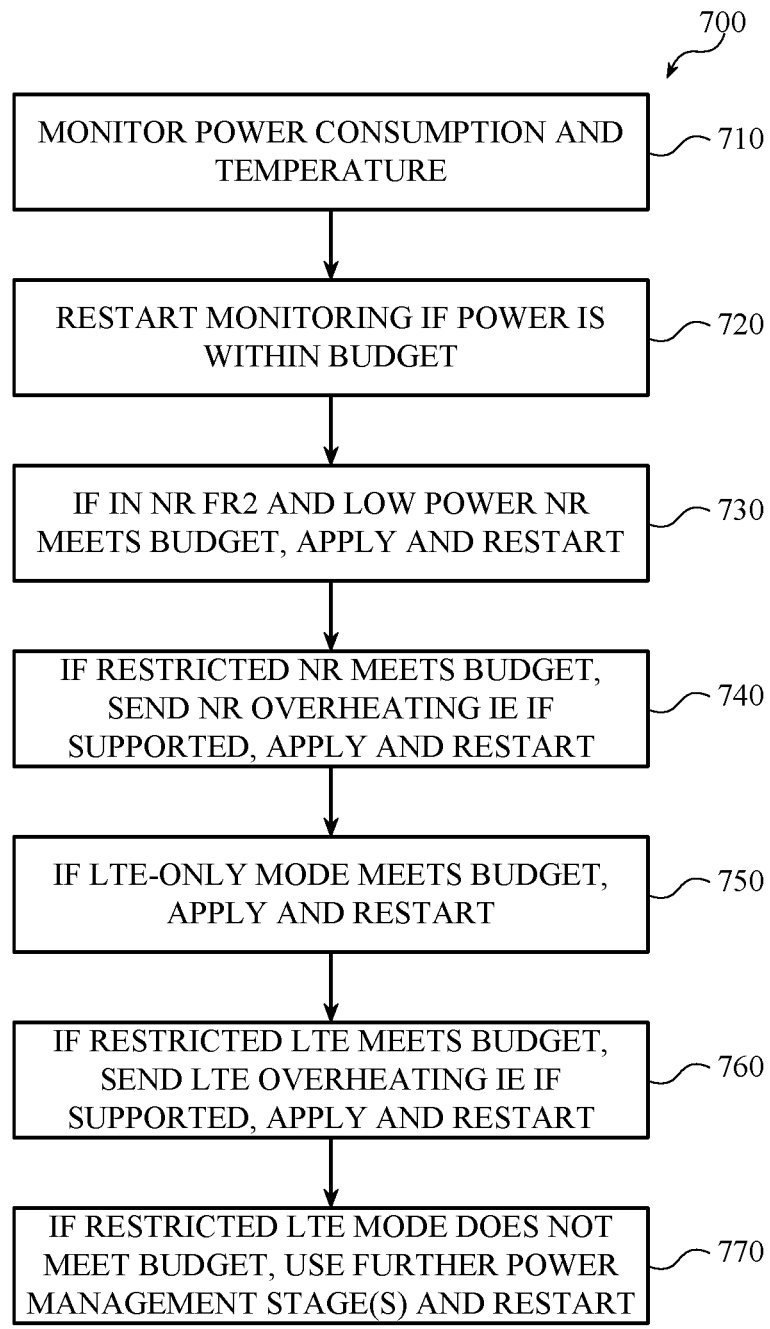
FIG. 7 is a flow diagram of a second example method or process employable at a UE that facilitates power management according to one of a plurality of power management stages in connection with one or more wireless modems, according to various aspects discussed herein.

Referring to FIG. 7, illustrated is a flow diagram of a second example method or process 700 employable at a UE that facilitates power management according to one of a plurality of power management stages in connection with one or more wireless modems, according to various aspects discussed herein. In other aspects, a machine readable medium can store instructions associated with method 700 that, when executed, can cause a UE (e.g., employing system $400_{UE}$) to perform the acts of method 700. Although method 700 is provided as one specific example aspect of techniques discussed herein, it is to be appreciated that other specific example aspects can employ additional and/or alternative techniques.

At 710, power consumption and temperature can be monitored to determine a power budget and power status relative to the power budget.

At 720, if the current power is within the power budget, method 700 can restart, returning to monitoring power consumption and temperature at 710.

At 730, if the UE is operating in NR Frequency Range 2 (mmWave) and/or employing one or more low power NR techniques can meet the power budget (e.g., as determined by the UE based on the current power budget and a known or estimated power usage and/or power status associated with application of the one or more low power NR techniques, etc.), NR operation can be restricted to FR1 and/or the one or more other low power NR techniques can be applied, and method 700 can restart, returning to monitoring power consumption and temperature at 710.

At 740, if employing one or more restricted NR mode techniques (e.g., according to FIG. 8A, discussed below, as otherwise discussed herein, etc.) can meet the power budget (e.g., as determined by the UE similarly to the determination at 730, but associated with application of the one or more restricted NR mode techniques (e.g., those discussed in connection with FIG. 8A), etc.), a NR OverheatingAssistance IE can be transmitted to a serving base station (e.g., gNB, eNB, etc.) if supported by the NW, the one or more restricted NR techniques can be applied, and method 700 can restart, returning to monitoring power consumption and temperature at 710.

At 750, if employing an LTE-only mode can meet the power budget (e.g., as determined by the UE similarly to the determination at 730, but associated with application of the LTE-only mode, etc.), the LTE-only mode (e.g., deactivating NR operation, etc.) can be applied, and method 700 can restart, returning to monitoring power consumption and temperature at 710.

At 760, if employing one or more restricted LTE mode techniques (e.g., according to FIG. 8B, discussed below, as otherwise discussed herein, etc.) can meet the power budget (e.g., as determined by the UE similarly to the determination at 730, but associated with application of the one or more restricted LTE mode techniques, etc.), an LTE OverheatingAssistance IE can be transmitted to a serving base station (e.g., gNB, eNB, etc.) if supported by the NW, the one or more restricted LTE techniques can be applied, and method 700 can restart, returning to monitoring power consumption and temperature at 710.

At 770, if employing one or more restricted LTE mode techniques cannot meet the power budget (e.g., as determined by the UE similarly to the determination at 730, but associated with application of the one or more restricted LTE mode techniques, etc.), one or more further power management stages can be employed (e.g., deactivating both LTE and NR, such as via airplane mode, etc.), and method 700 can restart, returning to monitoring power consumption and temperature at 710.

Additionally or alternatively, method 700 can include one or more other acts described herein in connection with various aspects of a UE and/or system 400$_{UE}$.

Figure 8A:
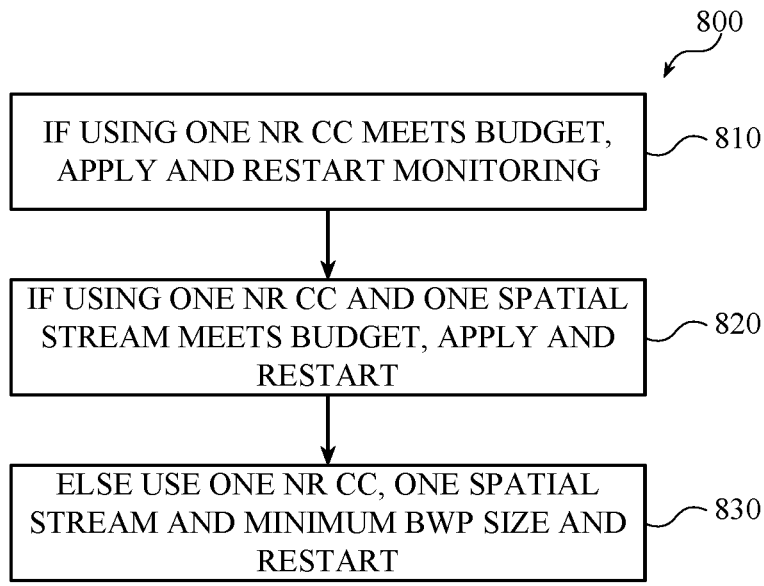
FIG. 8A is a flow diagram of an example method or process 800 employable at a UE that facilitates a restricted NR mode, according to various aspects discussed herein.

Referring to FIG. 8A, illustrated is a flow diagram of an example method or process 800 employable at a UE that facilitates a restricted NR mode, according to various aspects discussed herein. In other aspects, a machine readable medium can store instructions associated with method 800 that, when executed, can cause a UE (e.g., employing system 400$_{UE}$) to perform the acts of method 800. Although method 800 is provided as one specific example aspect employing a restricted NR mode as discussed herein, it is to be appreciated that other specific example aspects can employ additional and/or alternative techniques.

At 810, if employing one NR CC can meet the power budget (e.g., as determined by the UE similarly to the determination at 730, but associated with application of using a single NR CC, etc.), the NR connection can be reduced to a single CC (e.g., the Primary Cell (PCell)), and method 700 (or a similar method of power management implementing method 800) can restart, returning to monitoring power consumption and temperature (e.g., at 710, if method 700 is employed by the UE).

At 820, if employing one spatial stream (e.g., MIMO layer) can meet the power budget (e.g., as determined by the UE similarly to the determination at 730, but associated with application of using a single NR CC and spatial stream, etc.), the NR connection can be reduced to a single CC (e.g., the PCell) and a single spatial stream, and method 700 (or a similar method of power management implementing method 800) can restart, returning to monitoring power consumption and temperature (e.g., at 710, if method 700 is employed by the UE).

At 830, if employing one spatial stream (e.g., MIMO layer) cannot meet the power budget (e.g., as determined by the UE similarly to the determination at 730, but associated with application of using a single NR CC and spatial stream, etc.), the NR connection can be reduced to a single CC (e.g., the PCell), a single spatial stream, and the minimum Bandwidth Part (BWP) size, and method 700 (or a similar method of power management implementing method 800) can restart, returning to monitoring power consumption and temperature (e.g., at 710, if method 700 is employed by the UE).

Additionally or alternatively, method 800 can include one or more other acts described herein in connection with various aspects of a UE and/or system 400$_{UE}$ and restricted NR mode techniques.

Figure 8B:
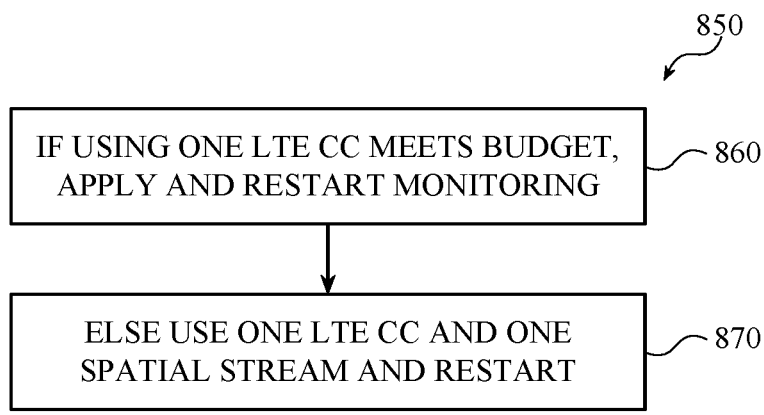
FIG. 8B is a flow diagram of an example method or process 850 employable at a UE that facilitates a restricted LTE mode, according to various aspects discussed herein.

Referring to FIG. 8B, illustrated is a flow diagram of an example method or process 850 employable at a UE that facilitates a restricted LTE mode, according to various aspects discussed herein. In other aspects, a machine readable medium can store instructions associated with method 850 that, when executed, can cause a UE (e.g., employing system 400$_{UE}$) to perform the acts of method 850. Although method 850 is provided as one specific example aspect employing a restricted LTE mode as discussed herein, it is to be appreciated that other specific example aspects can employ additional and/or alternative techniques.

At 860, if employing one LTE CC can meet the power budget (e.g., as determined by the UE similarly to the determination at 730, but associated with application of using a single LTE CC, etc.), the LTE connection can be reduced to a single CC (e.g., the PCell), and method 700 (or a similar method of power management implementing method 850) can restart, returning to monitoring power consumption and temperature (e.g., at 710, if method 700 is employed by the UE).

At 870, if employing one LTE CC cannot meet the power budget (e.g., as determined by the UE similarly to the determination at 730, but associated with application of using a single LTE CC, etc.), the LTE connection can be reduced to a single CC (e.g., the PCell) and a single spatial stream, and method 700 (or a similar method of power management implementing method 850) can restart, returning to monitoring power consumption and temperature (e.g., at 710, if method 700 is employed by the UE).

Additionally or alternatively, method 850 can include one or more other acts described herein in connection with various aspects of a UE and/or system 400$_{UE}$ and restricted LTE mode techniques.

ADDITIONAL EXAMPLES

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to aspects and examples described.

Example 1 is a processor of a user equipment (UE) comprising processing circuitry configured to: monitor a temperature of the UE via one or more temperature sensors and a power usage of the UE; determine a power status of the UE based at least in part on the temperature of the UE and the power usage of the UE; select, based at least in part on the determined power status, a power management stage of a plurality of power management stages; and implement one or more power management techniques associated with the selected power management stage.

Example 2 comprises the subject matter of any variation(s) of any of example(s) 1, wherein, prior to implementing the one or more power management techniques, the processing circuitry is further configured to trigger a notification to alert a user that the processor is implementing the one or more power management techniques.

Example 3 comprises the subject matter of any variation(s) of any of example(s) 1-2, wherein the selected power management stage is a low power New Radio (NR) stage, and wherein the one or more power management techniques associated with the low power NR stage comprise one or more of: limiting NR operation to Frequency Range 1, employing low-power beam management, employing a reduced number of beams for beam tracking, performing power-efficient beam selection, performing low-power measurements, or applying a reduced Bandwidth Part size for NR.

Example 4 comprises the subject matter of any variation(s) of any of example(s) 1-3, wherein the selected power management stage is a restricted New Radio (NR) mode stage, and wherein the one or more power management techniques associated with the restricted NR mode stage comprise one or more of: employing a reduced number of Component Carriers (CCs) for NR, employing a reduced number of spatial streams for NR, reporting a lowered value in a Power Headroom Report (PHR) for NR, employing one or more of Uplink (UL) throttling or transmit power capping for NR, employing Downlink (DL) throttling for NR, reporting a value lower than an accurate value in a Buffer Status Report (BSR) for NR, or suspending data communication in NR.

Example 5 comprises the subject matter of any variation(s) of any of example(s) 4, wherein the processing circuitry is further configured to generate a NR OverheatingAssistance message in response to the restricted NR mode stage being selected and in response to a determination that the NR OverheatingAssistance message is supported.

Example 6 comprises the subject matter of any variation(s) of any of example(s) 1-5, wherein the selected power management stage is a restricted Long Term Evolution (LTE) mode stage, and wherein the one or more power management techniques associated with the restricted LTE mode stage comprise one or more of: employing a reduced number of Component Carriers (CCs) for LTE, employing a reduced number of spatial streams for LTE, reporting a lowered value in a Power Headroom Report (PHR) for LTE, employing one or more of Uplink (UL) throttling or transmit power capping for LTE, employing Downlink (DL) throttling for LTE, reporting a value lower than an accurate value in a Buffer Status Report (BSR) for LTE, or suspending data communication in LTE.

Example 7 comprises the subject matter of any variation(s) of any of example(s) 6, wherein the one or more processors are further configured to generate an LTE OverheatingAssistance message in response to the restricted LTE mode stage being selected and in response to a determination that the LTE OverheatingAssistance message is supported.

Example 8 comprises the subject matter of any variation(s) of any of example(s) 1-7, wherein the selected power management stage is a Long Term Evolution (LTE)-only stage, and wherein the one or more power management techniques associated with the LTE-only stage comprise deactivating New Radio (NR) communication at the UE.

Example 9 comprises the subject matter of any variation(s) of any of example(s) 1-8, wherein the one or more power management techniques associated with the selected power management stage comprise deactivating New Radio (NR) communication at the UE and deactivating Long Term Evolution (LTE) communication at the UE.

Example 10 comprises the subject matter of any variation(s) of any of example(s) 1-9, wherein the selected power management stage is a lower power management stage than a current power management stage, and wherein the selected power management stage is selected based at least in part on the determined power status being lower than a first threshold value, the first threshold value being lower than a second threshold value associated with transitioning from the selected power management stage to the current power management stage.

Example 11 comprises the subject matter of any variation(s) of any of example(s) 1-10, wherein the selected power management stage is a lower power management stage than a current power management stage, and wherein the selected power management stage is selected based at least in part on the determined power status being lower than a first threshold value for at least a threshold amount of time.

Example 12 comprises the subject matter of any variation(s) of any of example(s) 1-11, wherein the UE is concurrently connected to two or more Radio Access Technologies (RATs) comprising a New Radio (NR) RAT and a Long Term Evolution (LTE) RAT.

Example 13 is a method, comprising: monitoring a temperature of the UE via one or more temperature sensors and a power usage of the UE; determining a power status of the UE based at least in part on the temperature of the UE and the power usage of the UE; selecting, based at least in part on the determined power status, a power management stage of a plurality of power management stages; and implementing one or more power management techniques associated with the selected power management stage.

Example 14 comprises the subject matter of any variation(s) of any of example(s) 13, wherein, prior to implementing the one or more power management techniques, the method further comprises triggering a notification to alert a user that the processor is implementing the one or more power management techniques.

Example 15 comprises the subject matter of any variation(s) of any of example(s) 13-14, wherein the selected power management stage is a low power New Radio (NR) stage, and wherein the one or more power management techniques associated with the low power NR stage comprise one or more of: limiting NR operation to Frequency Range 1, employing low-power beam management, employing a reduced number of beams for beam tracking, performing power-efficient beam selection, performing low-power measurements, or applying a reduced Bandwidth Part size for NR.

Example 16 comprises the subject matter of any variation(s) of any of example(s) 13-15, wherein the selected power management stage is a restricted New Radio (NR) mode stage, and wherein the one or more power management techniques associated with the restricted NR mode stage comprise one or more of: employing a reduced number of Component Carriers (CCs) for NR, employing a reduced number of spatial streams for NR, reporting a lowered value in a Power Headroom Report (PHR) for NR, employing one or more of Uplink (UL) throttling or transmit power capping for NR, employing Downlink (DL) throttling for NR, reporting a value lower than an accurate value in a Buffer Status Report (BSR) for NR, or suspending data communication in NR.

Example 17 comprises the subject matter of any variation (xsa)m polfe any of example(s) 16, further comprising generating a NR OverheatingAssistance message in response to the restricted NR mode stage being selected and in response to a determination that the NR OverheatingAssistance message is supported.

Example 18 comprises the subject matter of any variation(s) of any of example(s) 13-17, wherein the selected power management stage is a restricted Long Term Evolution (LTE) mode stage, and wherein the one or more power management techniques associated with the restricted LTE mode stage comprise one or more of: employing a reduced number of Component Carriers (CCs) for LTE, employing a reduced number of spatial streams for LTE, reporting a lowered value in a Power Headroom Report (PHR) for LTE, employing one or more of Uplink (UL) throttling or transmit power capping for LTE, employing Downlink (DL) throttling for LTE, reporting a value lower than an accurate value in a Buffer Status Report (BSR) for LTE, or suspending data communication in LTE.

Example 19 comprises the subject matter of any variation(s) of any of example(s) 18, further comprising generating an LTE OverheatingAssistance message in response to the restricted LTE mode stage being selected and in response to a determination that the LTE OverheatingAssistance message is supported.

Example 20 comprises the subject matter of any variation(s) of any of example(s) 13-19, wherein the selected power management stage is a Long Term Evolution (LTE)-only stage, and wherein the one or more power management techniques associated with the LTE-only stage comprise deactivating New Radio (NR) communication at the UE.

Example 21 comprises the subject matter of any variation(s) of any of example(s) 13-20, wherein the one or more power management techniques associated with the selected power management stage comprise deactivating New Radio (NR) communication at the UE and deactivating Long Term Evolution (LTE) communication at the UE.

Example 22 comprises the subject matter of any variation(s) of any of example(s) 13-21, wherein the selected power management stage is a lower power management stage than a current power management stage, and wherein the selected power management stage is selected based at least in part on the determined power status being lower than a first threshold value that is lower than a second threshold value associated with transition from the selected power management stage to the current power management stage.

Example 23 comprises the subject matter of any variation(s) of any of example(s) 13-22, wherein the selected power management stage is a lower power management stage than a current power management stage, and wherein the selected power management stage is selected based at least in part on the determined power status being lower than a first threshold value for at least a threshold amount of time.

Example 24 is a User Equipment (UE), comprising: one or more temperature sensors; one or more processors configured to: monitor a temperature of the UE via the one or more temperature sensors and a power usage of the UE; determine a power status of the UE based at least in part on the temperature of the UE and the power usage of the UE; select, based at least in part on the determined power status, a power management stage of a plurality of power management stages; and implement one or more power management techniques associated with the selected power management stage.

Example 25 comprises the subject matter of any variation(s) of any of example(s) 24, wherein, prior to implementing the one or more power management techniques, the one or more processors are further configured to trigger a notification to alert a user that the processor is implementing the one or more power management techniques.

Example 26 comprises the subject matter of any variation(s) of any of example(s) 24-25, wherein the selected power management stage is a low power New Radio (NR) stage, and wherein the one or more power management techniques associated with the low power NR stage comprise one or more of: limiting NR operation to Frequency Range 1, employing low-power beam management, employing a reduced number of beams for beam tracking, performing power-efficient beam selection, performing low-power measurements, or applying a reduced Bandwidth Part size for NR.

Example 27 comprises the subject matter of any variation(s) of any of example(s) 24-26, wherein the selected power management stage is a restricted New Radio (NR) mode stage, and wherein the one or more power management techniques associated with the restricted NR mode stage comprise one or more of: employing a reduced number of Component Carriers (CCs) for NR, employing a reduced number of spatial streams for NR, reporting a lowered value in a Power Headroom Report (PHR) for NR, employing one or more of Uplink (UL) throttling or transmit power capping for NR, employing Downlink (DL) throttling for NR, reporting a value lower than an accurate value in a Buffer Status Report (BSR) for NR, or suspending data communication in NR.

Example 28 comprises the subject matter of any variation(s) of any of example(s) 27, wherein the one or more processors are further configured to generate a NR OverheatingAssistance message in response to the restricted NR mode stage being selected and in response to a determination that the NR OverheatingAssistance message is supported.

Example 29 comprises the subject matter of any variation(s) of any of example(s) 24-28, wherein the selected power management stage is a restricted Long Term Evolution (LTE) mode stage, and wherein the one or more power management techniques associated with the restricted LTE mode stage comprise one or more of: employing a reduced number of Component Carriers (CCs) for LTE, employing a reduced number of spatial streams for LTE, reporting a lowered value in a Power Headroom Report (PHR) for LTE, employing one or more of Uplink (UL) throttling or transmit power capping for LTE, employing Downlink (DL) throttling for LTE, reporting a value lower than an accurate value in a Buffer Status Report (BSR) for LTE, or suspending data communication in LTE.

Example 30 comprises the subject matter of any variation(s) of any of example(s) 29, wherein the one or more processors are further configured to generate an LTE OverheatingAssistance message in response to the restricted LTE mode stage being selected and in response to a determination that the LTE OverheatingAssistance message is supported.

Example 31 comprises the subject matter of any variation(s) of any of example(s) 24-30, wherein the selected power management stage is a Long Term Evolution (LTE)-only stage, and wherein the one or more power management techniques associated with the LTE-only stage comprise deactivating New Radio (NR) communication at the UE.

Example 32 comprises the subject matter of any variation(s) of any of example(s) 24-31, wherein the one or more power management techniques associated with the selected power management stage comprise deactivating New Radio (NR) communication at the UE and deactivating Long Term Evolution (LTE) communication at the UE.

Example 33 comprises the subject matter of any variation(s) of any of example(s) 24-32, wherein the selected power management stage is a lower power management stage than a current power management stage, and wherein the selected power management stage is selected based at least in part on the determined power status being lower than a first threshold value that is lower than a second threshold value associated with transition from the selected power management stage to the current power management stage.

Example 34 comprises the subject matter of any variation(s) of any of example(s) 24-33, wherein the selected power management stage is a lower power management stage than a current power management stage, and wherein the selected power management stage is selected based at least in part on the determined power status being lower than a first threshold value for at least a threshold amount of time.

Example 35 comprises an apparatus comprising means for executing any of the described operations of examples 1-34.

Example 36 comprises a machine readable medium that stores instructions for execution by a processor to perform any of the described operations of examples 1-34.

Example 37 comprises an apparatus comprising: a memory interface; and processing circuitry configured to: perform any of the described operations of examples 1-34.

Example 38 comprises a User Equipment (UE) configured to execute any of the described operations of examples 1-34.

The above description of illustrated aspects of the subject disclosure, including what is described in the Abstract, is not intended to be exhaustive or to limit the disclosed aspects to the precise forms disclosed. While specific aspects and examples are described herein for illustrative purposes, various modifications are possible that are considered within the scope of such aspects and examples, as those skilled in the relevant art can recognize.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A processor of a user equipment (UE) comprising processing circuitry configured to:
   monitor a temperature of the UE via one or more temperature sensors and a power usage of the UE;
   determine a power status of the UE based at least in part on the temperature of the UE and the power usage of the UE;
   select, based at least in part on the determined power status, a power management stage of a plurality of power management stages; and
   implement one or more power management techniques associated with the selected power management stage,
   wherein the plurality of power management stages includes a first stage corresponding to normal operation with default power management techniques, a second stage configured to reduce power consumption compared to the first stage, and a third stage configured to further reduce power consumption compared to the second stage,
   wherein the one or more power management techniques corresponding to the second stage or the third stage-comprise power reducing techniques within one Radio Access Technology (RAT),
   wherein the UE is concurrently connected to two or more RATs, and
   wherein the plurality of power management stages further includes a fourth stage, the one or more power management techniques corresponding to the fourth stage comprising deactivating a RAT of the two or more RATs to further reduce power compared to the third stage.

2. The processor of claim 1, wherein, prior to implementing the one or more power management techniques, the processing circuitry is further configured to trigger a notification to alert a user that the processor is implementing the one or more power management techniques for power management stages of the plurality of power management stages other than the first, second, and third stages.

3. The processor of claim 1, wherein the one or more power management techniques associated with the second stage comprise one or more of: limiting operation to a frequency range less than operable frequency ranges of the RAT, employing low-power beam management, employing a reduced number of beams for beam tracking, performing power-efficient beam selection, performing low-power measurements, or applying a reduced Bandwidth Part size.

4. The processor of claim 1,
   wherein the one or more power management techniques associated with the third stage comprise one or more of: employing a reduced number of Component Carriers (CCs), employing a reduced number of spatial streams, reporting a lowered value in a Power Headroom Report (PHR), employing one or more of Uplink (UL) throttling or transmit power capping, employing Downlink (DL) throttling, reporting a value lower than an accurate value in a Buffer Status Report (BSR), or suspending data communication.

5. The processor of claim 4, wherein the processing circuitry is further configured to generate an OverheatingAssistance message in response to the third stage being selected and in response to a determination that the OverheatingAssistance message is supported.

6. The processor of claim 1, wherein the one RAT is New Radio (NR) or Long Term Evolution (LTE).

7. The processor of claim 1, wherein the plurality of power management stages further includes one or more final stages of deactivating the one RAT, deactivating all 3GPP communications, deactivating all wireless communications, or powering down the UE.

8. A method, comprising:
   monitoring a temperature of a User Equipment (UE) via one or more temperature sensors and a power usage of the UE;
   determining a power status of the UE based at least in part on the temperature of the UE and the power usage of the UE;
   selecting, based at least in part on the determined power status, a power management stage of a plurality of power management stages; and
   implementing one or more power management techniques associated with the selected power management stage,
   wherein the one or more power management techniques comprises techniques to reduce New Radio (NR) power consumption, and
   wherein the selected power management stage is a low power New Radio (NR) stage, and wherein the one or more power management techniques associated with the low power NR stage comprise one or more of: limiting NR operation to Frequency Range 1, employing low-power beam management, employing a reduced number of beams for beam tracking, performing power-efficient beam selection, performing low-power measurements, or applying a reduced Bandwidth Part size for NR.

9. The method of claim 8, wherein, prior to implementing the one or more power management techniques, the method further comprises triggering a notification to alert a user that a processor is implementing the one or more power management techniques.

10. The method of claim 8, wherein if the selected power management stage is a restricted mode stage, the one or more power management techniques comprise one or more of: employing a reduced number of Component Carriers (CCs), employing a reduced number of spatial streams, reporting a lowered value in a Power Headroom Report (PHR), employing one or more of Uplink (UL) throttling or transmit power capping, employing Downlink (DL) throttling, reporting a value lower than an accurate value in a Buffer Status Report (BSR), or suspending data communication.

11. The method of claim 8, wherein the selected power management stage is a lower power management stage than a current power management stage, and wherein the selected power management stage is selected based at least in part on the determined power status being lower than a first threshold value that is lower than a second threshold value associated with transition from the selected power management stage to the current power management stage.

12. The method of claim 8, wherein the selected power management stage is a lower power management stage than a current power management stage, and wherein the selected power management stage is selected based at least in part on the determined power status being lower than a first threshold value for at least a threshold amount of time.

13. A User Equipment (UE), comprising:
one or more temperature sensors;
one or more processors configured to:
monitor a temperature of the UE via the one or more temperature sensors and a power usage of the UE;
determine a power status of the UE based at least in part on the temperature of the UE and the power usage of the UE;
select, based at least in part on the determined power status, a power management stage of a plurality of power management stages; and
implement one or more power management techniques associated with the selected power management stage,
wherein the plurality of power management stages comprises a Long Term Evolution (LTE)-only stage, and wherein the one or more power management techniques associated with the LTE-only stage comprise deactivating Previously Presented Radio (NR) communication at the UE.

14. The UE of claim 13, wherein, prior to implementing the one or more power management techniques, the one or more processors are further configured to trigger a notification to alert a user that the one or more processors are implementing the one or more power management techniques.

15. The UE of claim 13, wherein the selected power management stage is a low power Previously Presented Radio (NR) stage, and wherein the one or more power management techniques associated with the low power NR stage comprise one or more of: limiting NR operation to Frequency Range 1, employing low-power beam management, employing a reduced number of beams for beam tracking, performing power-efficient beam selection, performing low-power measurements, or applying a reduced Bandwidth Part size for NR.

16. The UE of claim 13, wherein the selected power management stage is a restricted Previously Presented Radio (NR) mode stage, and wherein the one or more power management techniques associated with the restricted NR mode stage comprise one or more of: employing a reduced number of Component Carriers (CCs) for NR, employing a reduced number of spatial streams for NR, reporting a lowered value in a Power Headroom Report (PHR) for NR, employing one or more of Uplink (UL) throttling or transmit power capping for NR, employing Downlink (DL) throttling for NR, reporting a value lower than an accurate value in a Buffer Status Report (BSR) for NR, or suspending data communication in NR.

17. The UE of claim 13, wherein, prior to implementing the one or more power management techniques, the one or more processors are further configured to trigger a notification to alert a user that the one or more processors are implementing the one or more power management techniques when the LTE-only stage is selected.

18. The UE of claim 13, wherein the one or more power management techniques associated with the selected power management stage comprise deactivating New Radio (NR) communication at the UE and deactivating Long Term Evolution (LTE) communication at the UE.

* * * * *